(12) United States Patent
Reilhac

(10) Patent No.: US 9,855,957 B2
(45) Date of Patent: Jan. 2, 2018

(54) METHOD FOR USING A COMMUNICATION TERMINAL IN A MOTOR VEHICLE WHILE AUTOPILOT IS ACTIVATED AND MOTOR VEHICLE

(71) Applicant: VALEO Schalter und Sensoren GmbH, Bietigheim-Bissingen (DE)

(72) Inventor: Patrice Reilhac, Bietigheim-Bissingen (DE)

(73) Assignee: VALEO Schalter und Sensoren GmbH, Beitigheim-Bissingen (DE)

( * ) Notice: Subject to any disclaimer, the term of this patent is extended or adjusted under 35 U.S.C. 154(b) by 48 days.

(21) Appl. No.: 14/909,369

(22) PCT Filed: Jul. 30, 2014

(86) PCT No.: PCT/EP2014/066378
§ 371 (c)(1),
(2) Date: Apr. 14, 2016

(87) PCT Pub. No.: WO2015/014894
PCT Pub. Date: Feb. 5, 2015

(65) Prior Publication Data
US 2016/0280234 A1 Sep. 29, 2016

(30) Foreign Application Priority Data

Jul. 31, 2013 (DE) .......................... 10 2013 012 777

(51) Int. Cl.
*G01C 22/00* (2006.01)
*B60W 50/08* (2012.01)
(Continued)

(52) U.S. Cl.
CPC ........... *B60W 50/082* (2013.01); *B60K 35/00* (2013.01); *G05D 1/0061* (2013.01);
(Continued)

(58) Field of Classification Search
CPC ........... B60W 50/82; B60W 2050/146; B60W 2540/22; B60K 35/00; B60K 2350/352; G05D 1/0061; G05D 2201/0213
(Continued)

(56) References Cited

U.S. PATENT DOCUMENTS 6,055,467 A * 4/2000 Mehring ............... G05D 1/0246
180/168
8,346,426 B1 * 1/2013 Szybalski ............. B60W 50/14
701/25
(Continued)

FOREIGN PATENT DOCUMENTS

DE 298 06 461 U1 6/1998
DE 10 2006 006995 A1 8/2007
(Continued)

OTHER PUBLICATIONS

International Search Report issued in PCT/EP2014/066378 dated Feb. 6, 2015 (3 pages).
(Continued)

*Primary Examiner* — Shardul Patel
(74) *Attorney, Agent, or Firm* — Osha Liang LLP

(57) ABSTRACT

A method for operating a motor vehicle, which is switched between a manual driving mode and an automatic driving mode is disclosed. At least in the manual driving mode, a vehicle-specific display device of the motor vehicle is operated using an input device arranged on a steering wheel of the motor vehicle. A communication connection is established between a communication device of the motor vehicle and a portable communication terminal separate from the motor vehicle. An entertainment mode is activated in the automatic driving mode of the motor vehicle. In the entertainment mode, the input device of the steering wheel is used for performing inputs at the communication terminal and/or (Continued)

Figure 1:
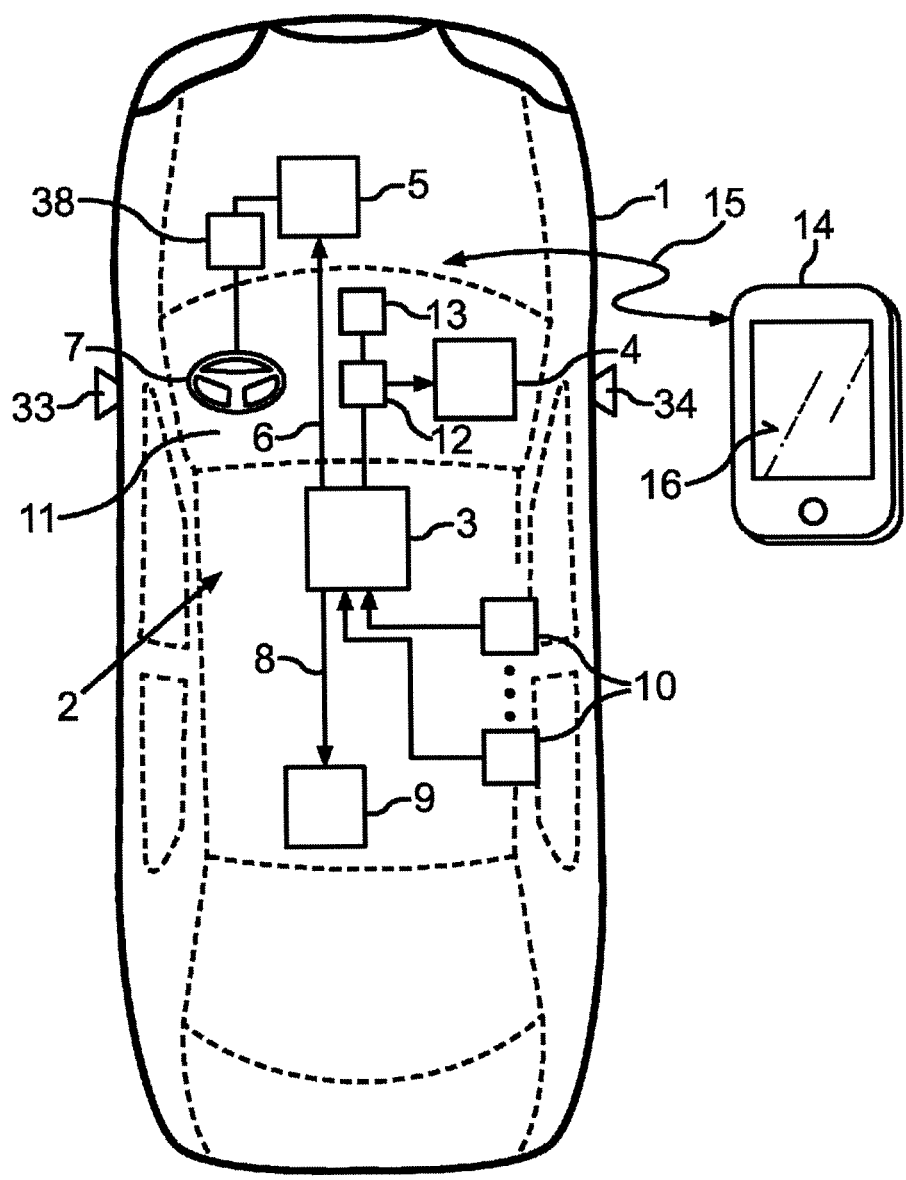

the display device is used for displaying image data of the communication terminal.

10 Claims, 2 Drawing Sheets

(51) Int. Cl.
*B60K 35/00* (2006.01)
*G05D 1/00* (2006.01)
*B60W 50/14* (2012.01)

(52) U.S. Cl.
CPC .. *B60K 2350/352* (2013.01); *B60W 2050/146* (2013.01); *B60W 2540/22* (2013.01); *G05D 2201/0213* (2013.01)

(58) Field of Classification Search
USPC .......................... 701/23, 25; 455/39; 248/77
See application file for complete search history.

(56) References Cited

U.S. PATENT DOCUMENTS

| | | | | |
|---|---|---|---|---|
| 8,688,306 | B1* | 4/2014 | Nemec | G05D 1/0055 104/250 |
| 2009/0189373 | A1* | 7/2009 | Schramm | B60K 35/00 280/731 |
| 2010/0228417 | A1 | 9/2010 | Lee et al. | |
| 2012/0089294 | A1 | 4/2012 | Fehse et al. | |
| 2012/0105613 | A1* | 5/2012 | Weng | G01C 21/3664 348/77 |
| 2012/0277947 | A1* | 11/2012 | Boehringer | B60W 30/17 701/23 |
| 2013/0045677 | A1* | 2/2013 | Chien | H04W 76/023 455/39 |
| 2013/0117021 | A1 | 5/2013 | James | |
| 2013/0134730 | A1* | 5/2013 | Ricci | G06F 9/54 296/24.34 |
| 2014/0156133 | A1* | 6/2014 | Cullinane | B60W 30/00 701/23 |

FOREIGN PATENT DOCUMENTS

| | | |
|---|---|---|
| DE | 10 2009 048954 A1 | 4/2011 |
| DE | 10 2011 013 023 A1 | 9/2012 |
| FR | 2 861 657 A1 | 5/2005 |
| WO | 2007/021263 A1 | 2/2007 |

OTHER PUBLICATIONS

Written Opinion of the International Searching Authority issued in PCT/EP2014/066378 dated Feb. 6, 2015 (6 pages).

* cited by examiner

METHOD FOR USING A COMMUNICATION TERMINAL IN A MOTOR VEHICLE WHILE AUTOPILOT IS ACTIVATED AND MOTOR VEHICLE

The invention relates to a method for operating a motor vehicle, which is switched between a manual driving mode, in which the motor vehicle is guided by a driver, and an automatic driving mode, in which longitudinal guidance and transverse guidance of the motor vehicle are carried out automatically by means of a control device of the motor vehicle, wherein, at least in the manual driving mode, a vehicle-specific display device of the motor vehicle is operated by means of an input device arranged on a steering wheel of the motor vehicle. The invention additionally relates to a motor vehicle for carrying out such a method.

Driver assistance devices for automatically guiding a motor vehicle are already known from the prior art. In this case, such an autopilot can perform both the control of the longitudinal guidance and the control of the transverse guidance of the motor vehicle. This means that acceleration and braking and also the steering angle are automatically controlled by means of a control device of the motor vehicle. For this purpose, the control device can output corresponding control signals to a steering system of the motor vehicle and to a drivetrain. In this case, the automatic guiding of the motor vehicle is carried out without the driver being involved.

Automatic driving is possible, in principle, only in predetermined driving situations. The fact of whether the motor vehicle can be switched from the manual driving mode to the automatic driving mode and can thus be guided autonomously by the control device depends on a large number of parameters that are constantly checked by means of the control device. By means of the control device a check is continuously made to ascertain whether or not predetermined criteria for activating the autopilot are currently satisfied. One of these criteria may presuppose that longitudinal markings are applied on the roadway, which can be detected by means of the control device on the basis of image data from a camera. A further criterion may be, for example, that a sufficiently accurate road map is available for the planned route to a predefined destination, which road map can be taken as a basis for automatic driving. Further conditions may concern for example the state of the roadway, the current weather conditions and the current traffic density.

If the control device ascertains that the criteria are satisfied, then the possibility of switching to the automatic driving mode can be signalled to the driver by means of a corresponding output device, namely in particular optically and/or acoustically. In this way, the driver is informed of the possibility of activation of the autopilot and can switch on the automatic driving mode himself/herself, for example by performing a corresponding input on an operating device provided for this purpose in the motor vehicle. With the automatic driving mode activated, the driver additionally always has the possibility of deactivating the autopilot again and switching the motor vehicle to the manual driving mode again, in which the motor vehicle is controlled by the driver himself/herself. For this purpose, the driver needs for example merely to grasp the steering wheel again and steer the steerable wheels himself/herself. Such a procedure is described for example in the documents US 2010/0228417, DE 10 2011 013 023 A1 and US 2012/089 294. Said documents propose various methods as to how the driver can take control of his/her vehicle again.

If a motor vehicle is automatically guided by means of a control device, then it is also necessary in specific cases to pass control of the motor vehicle to the driver again automatically. This is necessary for example if a risk of collision is detected or else if the ambient conditions change rapidly and rain, for example, is detected. However, communication between the motor vehicle and the driver has proved to be problematic in such situations. If control of the vehicle is to be handed back to the driver, then this ought also to be correspondingly signalled to the driver, and it ought to be ensured that the driver can take control of the motor vehicle particularly rapidly and reliably. This has proved to be difficult in the prior art in particular for the reason that during the automatic driving mode the driver does not usually concentrate on the current road situation and, moreover, the driver's hands are not positioned on the steering wheel. This is the case for example if, during the automatic driving mode, the driver operates a portable communication terminal such as, for example, a cellular phone, a so-called tablet PC, a notebook or the like. If the driver has to take control of the motor vehicle again in such situations, then experience shows that this can take a relatively long time until the driver positions his/her hands on the steering wheel again and directs his/her gaze forwards at the road again. Consequently, there is a particular challenge firstly in giving the driver the possibility of using his/her communication terminals without restriction during the automatic driving mode, and secondly in implementing measures which, when switching from the automatic driving mode to the manual driving mode, ensure that the driver's attention is directed at events on the road again particularly rapidly.

It is an object of the invention to demonstrate a solution as to how, in a method of the generic type mentioned in the introduction, when switching from the automatic driving mode to the manual driving mode, the driver's attention can be directed at guiding the motor vehicle again particularly rapidly.

This object is achieved according to the invention by means of a method and by means of a motor vehicle having the features according to the respective independent patent claims. Advantageous embodiments of the invention are the subject matter of the dependent patent claims, the description and the figures.

In a method according to the invention, a motor vehicle is switched between a manual driving mode and an automatic driving mode. In the manual driving mode, the motor vehicle is guided by a driver, namely in particular using a steering wheel and using pedals of the motor vehicle. In the automatic driving mode, by contrast, the longitudinal guidance and transverse guidance of the motor vehicle are carried out autonomously or automatically by means of a control device of the motor vehicle. This means that the control device controls the steering angle of the motor vehicle and also the acceleration and braking processes of the motor vehicle automatically and thus without the driver being involved. At least in the manual driving mode a vehicle-specific display device of the motor vehicle, which display device is thus fixedly incorporated in the motor vehicle, is operated by means of an input device arranged on the steering wheel. The driver can thus perform corresponding inputs on the input device of the steering wheel and can thus control the display device. A communication connection is established between a communication device of the motor vehicle, on the one hand, and a portable communication terminal separate from the motor vehicle. An entertainment mode is activated in the automatic driving mode, in which entertainment mode, via the communication connection, input data generated by the input device of the steering wheel are transmitted to the communication terminal, with the result that the communication terminal is thus controlled by means of the input device of the steering wheel or the input device is used for performing inputs at the communication terminal. Supplementarily or alternatively, it is provided that, in the entertainment mode, image data generated by the communication terminal and serving for display on the vehicle-specific display device are transmitted to the communication device of the motor vehicle, such that the display device is used for displaying image data of the communication terminal.

The invention thus provides for a vehicle-specific user interface of the motor vehicle to be used as an interface for operating the communication terminal in the automatic driving mode. On the one hand, the driver can thus operate his/her communication terminal via the input device of the steering wheel, to be precise without having to remove his/her hands from the steering wheel. On the other hand, the driver also does not need to view the display of the portable communication terminal since the screen contents of the portable communication terminal can be represented on the vehicle-specific display device. In this way, the driver can maintain his/her posture that the driver otherwise also usually has when manually guiding the motor vehicle. What is thus achieved when switching from the automatic driving mode to the manual driving mode is that the driver is already holding the steering wheel with his/her hands and/or his/her gaze direction is already directed forwards in the direction of travel, with the result that valuable seconds can be gained here. When switching from the automatic driving mode to the manual driving mode, in this way the driver takes control of the motor vehicle again particularly rapidly, and dangerous situations can be prevented. A further advantage of the method according to the invention resides in the user-friendly operation of the communication terminal. Specifically, the driver can operate the communication terminal using the user-friendly and often significantly more convenient and more ergonomic user interface of the vehicle and can thus access the applications installed on the communication terminal, for example. In this regard, for example, a significantly larger display of the motor vehicle in comparison with a communication terminal and/or the ergonomic input device of the steering wheel are/is used. In the entertainment mode, the driver has the possibility of also controlling the communication terminal via the user interface of the motor vehicle.

In the present case, a portable communication terminal is understood to mean a mobile terminal which is designed for communication with other terminals. The communication terminal can be for example a cellular phone having a display (so-called smartphone), a tablet PC, a notebook or some other terminal on which an arbitrary operating system is installed and other applications can also be installed.

The vehicle-specific communication device can be designed for example to set up the communication connection to the portable communication terminal with the aid of a standardized communication protocol. Said communication connection is preferably a wireless data exchange connection via which the input data and/or the image data are transmitted wirelessly. As communication standard for the communication connection it is possible to use, for example, the so-called "Bluetooth Low Energy" standard and/or a communication standard of the "WLAN" or "WiFi" family, such as, for example, the so-called "Miracast" communication standard, and/or a manufacturer-specific communication standard, such as, for example, the Airplay standard and/or the WiDi standard.

In the vehicle, the communication device can be assigned a control unit—for example in the form of a microcontroller—which controls the communication and thus the data exchange with the communication terminal. Said control unit can provide said input data and communicate them as control signals to the communication terminal and/or receive the image data of the communication terminal and cause a representation corresponding to said image data to be displayed by means of the display device in the vehicle.

Preferably, it is provided that, exclusively in the automatic driving mode, the driver has the possibility of operating the communication terminal via the user interface in the vehicle. In one embodiment, it is provided that the entertainment mode is deactivated when the motor vehicle is switched from the automatic driving mode to the manual driving mode. The transmission of the image data and/or of the input data is thus prevented in the manual driving mode. By way of example, even the communication connection between the motor vehicle and the communication terminal can be interrupted here. In this way it is ensured that the driver can concentrate on events on the road again and is thus not distracted from the road situation by the operation of the communication terminal. When the motor vehicle is switched from the automatic to the manual driving mode and thus when the entertainment mode is deactivated, the input device of the steering wheel can be used again in a conventional manner for controlling the display device. In the manual driving mode, preferably only driving-specific or vehicle-related items of information, such as, for example, navigation instructions, consumption values of the vehicle and the like, are displayed on the display device.

Preferably, the image data communicated from the communication terminal to the communication device comprise a current screen content of the communication terminal. A representation displayed by means of the display device of the motor vehicle can then be generated in accordance with the screen content of the communication terminal. This means, in particular, that the representation displayed by means of the display device is constantly synchronized with the screen content of the communication terminal on the basis of the received image data. In other words, the same representation as is currently also being displayed on a display of the communication terminal is displayed by means of the display device in the vehicle. Therefore, the driver does not need to view the communication terminal at all, nor does the driver need to have the communication terminal actually to hand in order to be able to access the data contents of the communication terminal. This proves to be advantageous particularly in situations in which the communication terminal is out of the driver's reach, such as in a boot, for instance. Moreover, this makes it possible that the driver can always direct his/her gaze without interruption at the vehicle-specific display device and can thus immediately comprehend the road situation in the event of switching to the manual driving mode.

It is advantageous if the input device of the steering wheel comprises a touch-sensitive surface or a so-called "touchpad" and the input data are generated depending on a position at which the touch-sensitive surface is touched by the driver. The driver, via the input device of the steering wheel, can thus operate the communication terminal in the same way as is also usually the case with the conventional communication terminals, namely with the aid of a touch-sensitive surface. Operation is thus particularly user-friendly.

What has been found to be problematic, then, is that in customary communication terminals, such as cellular phones, for example, a so-called touchscreen is used, in the case of which the user always knows which symbols on the display he/she actually touches. This is not the case with a touch-sensitive surface spatially decoupled from the display device, with the result that here additional measures have to be taken which ensure that the driver is informed about the location at which he/she must touch the touch-sensitive surface in order to be able to select the desired functions.

In order to solve this problem, it is proposed, by means of a sensor, to detect a position of a body part of the driver—in particular of a finger—above the touch-sensitive surface of the steering wheel and relative to said surface and to insert a cursor into a representation currently being displayed by means of the display device, the position of said cursor being set depending on the position of the body part above the touch-sensitive surface. In this embodiment, therefore, the position of the body part is already measured during an approach to the touch-sensitive surface, and the representation of the cursor is adapted such that the position of the cursor on the display device corresponds to the current position of the body part relative to the touch-sensitive surface. The driver can thus immediately comprehend in what direction he/she must move his/her body part in order to select the desired function, for example to select the desired object on the display device and to the activate the assigned application. If the touch-sensitive surface is then touched, the cursor can be represented in a magnified fashion on the display device in order to signal the touching of the touch-sensitive surface.

Supplementarily or alternatively, it can also be provided that a display arranged on the steering wheel is used as the display device, said display comprising the touch-sensitive surface. Said display is then a touchscreen that functions simultaneously as input device and display device. Supplementarily or alternatively, a so-called head-up display, i.e. a projector by means of which the representation is projected onto the windscreen, can also be used as the display device.

Very generally it can be provided that a display of an instrument cluster of the motor vehicle is used as the display device, said instrument cluster being situated directly in front of the driver or in front of the driver's seat in the direction of travel. What is thus achieved is that in the automatic driving mode, too, the driver's gaze direction is always oriented forwards in the direction of travel, which—as already explained—has the advantage that when switching to the manual driving mode the driver can gain a good overview of events on the road again particularly rapidly.

In one embodiment, it is provided that by means of a decoupling device of the motor vehicle, the steering wheel is completely decoupled from a steering movement of the steerable wheels of the motor vehicle in the entertainment mode. What is achieved by means of such a decoupling device is that in the entertainment mode the steering wheel can always be kept in the same angular position—in particular in a zero position—to be precise independently of the angular position that the steerable wheels of the motor vehicle are currently in. Consequently, steering of the wheels does not lead to rotation of the steering wheel. This has the advantage that the driver is not adversely affected when operating the communication terminal in the entertainment mode and can always use the input device, without the angular position of the steering wheel having to be constantly tracked and the posture having to be correspondingly adapted.

In the entertainment mode it can also be provided that images which are based on image data provided by means of at least one camera arranged on the motor vehicle are displayed by means of the display device. By way of example, this can involve a camera which is arranged on a side flank of the motor vehicle and is integrated into a side mirror, for example, and captures a lateral surrounding region alongside the motor vehicle. The recorded images can then be represented on the display device, with the result that the driver is informed of the situation around the motor vehicle. In particular, in this case it is possible to display video data recorded by a camera integrated into the left exterior mirror, on the one hand, and by a camera integrated in the right exterior mirror, on the other hand. The driver thus receives a display also of the situation on the left and right alongside the motor vehicle directly on the display device and thus does not need to withdraw his/her gaze from the display device.

The invention additionally relates to a motor vehicle which can be switched between a manual driving mode and an automatic driving mode and comprises a control device, which carries out longitudinal guidance and transverse guidance of the motor vehicle automatically in the automatic driving mode. The motor vehicle additionally has a display device and an input device arranged on a steering wheel and serving for operating the display device at least in the manual driving mode. The motor vehicle comprises a communication device designed for establishing a communication connection to a portable communication terminal, and also a control unit, which activates an entertainment mode in the automatic driving mode and in the entertainment mode, via the communication connection, transmits input data generated by the input device of the steering wheel to the communication terminal and/or receives image data generated by the communication terminal and displays them by means of the display device.

The preferred embodiments presented with regard to the method according to the invention and their advantages correspondingly apply to the motor vehicle according to the invention.

Further features of the invention are evident from the claims, the figures and the description of the figures. All features and feature combinations mentioned above in the description and the features and feature combinations mentioned below in the description of the figures and/or shown in the figures alone can be used not only in the combination respectively specified, but also in other combinations or else by themselves.

The invention will now be explained in greater detail on the basis of an exemplary embodiment and with reference to the accompanying drawings.

Figure 2:
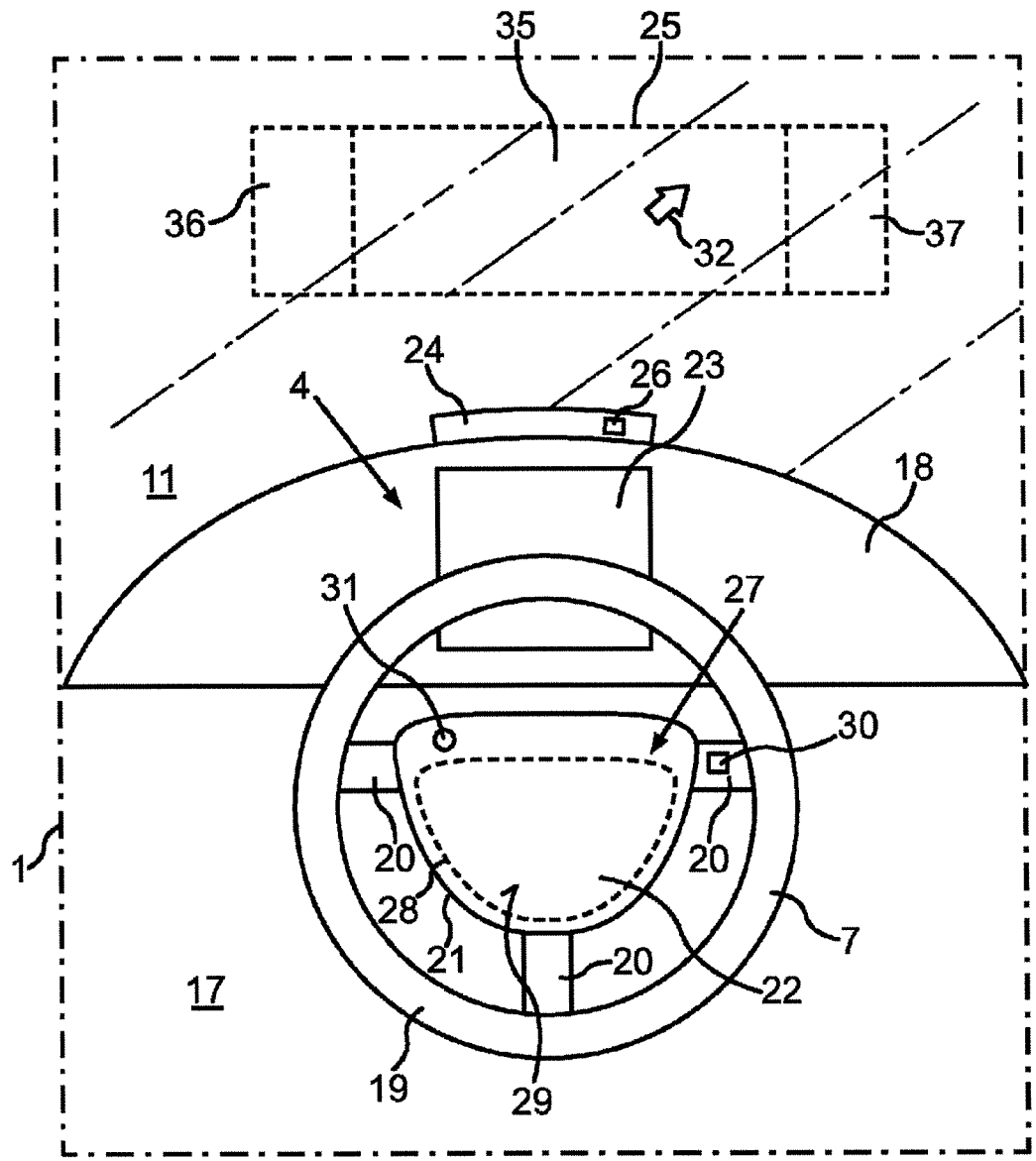

In the figures:

FIG. 1 shows a schematic illustration of a motor vehicle in accordance with one embodiment of the invention; and FIG. 2 shows a schematic illustration of a front region of an interior of the motor vehicle including an instrument cluster and a steering wheel.

A motor vehicle 1 illustrated in FIG. 1 is a car, for example. The motor vehicle 1 comprises a driver assistance device 2, which is designed for automatically guiding the motor vehicle 1 and thus serves as an autopilot. The driver assistance device 2 comprises a control device 3 and a display device 4 fixedly installed in the motor vehicle 1. The control device 3 is coupled to a steering apparatus 5 of the motor vehicle 1 and can output control signals to the steering apparatus 5 in order to control the steering angle of the motor vehicle 1 autonomously or automatically in order to guide the motor vehicle 1 for example along a previously defined navigation route.

A steering wheel 7 is additionally connected to the steering apparatus 5. The control device 3 can also output corresponding control signals 8 to a drivetrain 9 of the motor vehicle 1 in order also to control the longitudinal guidance of the motor vehicle 1. As a result of the outputting of the control signals 8 to the drivetrain 9, the motor vehicle 1 can be accelerated and braked automatically by means of the control device 3.

The control device 3 additionally receives sensor data from a sensor device 10, which can comprise a multiplicity of sensors. The sensor device 10 can comprise for example environment sensors for detecting obstacles, such as, for example, ultrasonic sensors and/or radar sensors and/or optical sensors. Supplementarily or alternatively, the sensor device 10 can also comprise sensors which serve for detecting current ambient conditions in the surroundings of the motor vehicle 1. This can involve a rain sensor, for example.

Furthermore, the sensor device 10 can also comprise a navigation receiver designed for providing position data that characterize the current geographical position of the motor vehicle 1.

The driver assistance device 2 or the motor vehicle 1 can be switched from a manual driving mode to an automatic driving mode, with the result that, as it were, an autopilot is activated. In this automatic driving mode, the control device 3 controls the steering angle and thus the transverse guidance and also the longitudinal guidance of the motor vehicle 1.

If the motor vehicle 1 is in the manual driving mode, then the control device 3 constantly checks whether or not predetermined criteria for activating the automatic driving mode are satisfied. These criteria are checked on the basis of the sensor data of the sensor device 10. If the control device 3 ascertains that it is possible to activate the automatic driving mode at the current point in time, then this is signalled to the driver, and the driver can activate the current driving mode while performing an input on a corresponding input device. Alternatively, the driver can also leave it in the manual driving mode and continue to guide the motor vehicle 1 himself/herself. If the automatic driving mode is activated, then the motor vehicle 1 is guided autonomously by the control device 3.

With the automatic driving mode activated, there are then two possibilities for deactivating the automatic driving mode and switching to the manual driving mode: firstly, the driver himself/herself always has the possibility of switching the motor vehicle 1 from the automatic driving mode to the manual driving mode again. This can be performed by means of the abovementioned input device, for example. Secondly, however, it can also happen that the automatic driving mode has to be automatically deactivated again by means of the control device 3 autonomously and thus driver-independently if the control device 3 ascertains that one of the abovementioned criteria is no longer satisfied. This can happen for example if, on the basis of the sensor data of the sensor device 10, a large degree of danger with regard to collision with an obstacle and/or rain is detected and/or a predefined time duration since the activation of the automatic driving mode has elapsed and/or an accurate road map for the navigation of the motor vehicle 1 is not available. In this case, it can be provided that, before the automatic driving mode is deactivated and the manual driving mode is activated again, a transition mode is activated in which control of the vehicle guidance is intended to be handed over to the driver. In this transition mode, the control device 3 checks whether or not the driver actuates the steering wheel 7 and thus takes control of the motor vehicle 1. For this purpose, for example, a check can be made to ascertain whether the steering wheel 7 is turned by the driver himself/herself. Supplementarily or alternatively, touch sensors that can detect touching of the steering wheel rim can also be arranged on the steering wheel 7. Furthermore supplementarily or alternatively, a camera can also be used, as is described in greater detail further below.

With regard to the display device 4, the following embodiments can be provided: the display device 4 can be, in principle, part of an instrument cluster of the motor vehicle 1 and comprise one of the following components:

- a transparent display which is attached to a windscreen 11 of the motor vehicle 1 and, moreover, is arranged directly in front of the driver's seat and thus on the driver's side with respect to the vehicle central longitudinal axis, and/or
- a head-up display, by means of which a representation is projected onto the windscreen 11—it is also possible to use a so-called panoramic head-up display having a relatively wide horizontal aperture angle of 15° to 50°, and/or
- a display integrated directly into the instrument cluster or the dashboard in front of the driver's seat, and/or
- a display on the steering wheel 7, for example also a touchscreen having a touch-sensitive surface as part of the input device.

Referring further to FIG. 1, the motor vehicle 1 also comprises an electronic control unit 12, which is coupled to the display device 4 and drives the latter. The control unit 12 is furthermore coupled to said input device arranged on the steering wheel 7, said input device not being illustrated in more specific detail in FIG. 1. The control unit 12 is furthermore coupled to the control device 3 and can communicate with the latter. Moreover, the control unit 12 is coupled to a vehicle-specific communication device 13 designed for wireless communication with a communication terminal 14. Between the communication device 13, on the one hand, and the communication terminal 14, on the other hand, it is possible to set up a communication connection 15 which is wireless and can use one of the communication standards already known. The communication terminal 14 is embodied for example as a cellular phone having a display 16, which can be embodied as a touchscreen.

Although the control unit 12 in FIG. 1 is illustrated as a component embodied separately from the control device 3, provision can also be made for the control unit 12 and the control device 3 to be formed by one and the same controller that serves both for driving the steering apparatus 5 and the drivetrain 9 and for driving the display device 4.

FIG. 2 illustrates a schematic illustration of a front region of an interior 17 of the motor vehicle 1 including the windscreen 11, the steering wheel 7 and an instrument cluster 18. In this case, FIG. 2 shows the steering wheel 7 from the viewpoint of the driver. In a manner known per se, the steering wheel 7 is arranged before the windscreen 11, i.e. between the windscreen 11, on the one hand, and the driver's seat, on the other hand. The instrument cluster 18 is situated between the steering wheel 7 and the windscreen 11, and can optionally also have a tachometer, an odometer, if appropriate a rev counter and the like.

The steering wheel 7 has a steering wheel rim 19, which is embodied in a ring-shaped fashion, for example. The steering wheel rim 19 is connected to a hub 21 via steering wheel spokes 20, on which, if appropriate, operating elements can be arranged. The hub 21 carries a cover 22 for an airbag (not illustrated) that is integrated into the hub 21. The cover 22 faces the driver and is visible from outside. The cover 22 and/or the hub 21 can have a wide variety of geometrical shapes, in principle. The circular shape, the rectangular shape, an oval shape and a D-shape illustrated in FIG. 2 shall be mentioned here merely by way of example.

As already explained, the display device 4 can have for example a display 23 integrated into the instrument cluster 8, and/or a head-up display 24. The display 23 can be an LCD display, for example. The head-up display 24 is a projector designed for projecting representations onto the windscreen 11. Such a representation is indicated by 25 in FIG. 2. A camera 26 can optionally be integrated into the head-up display 24, said camera being aligned with the driver and thus providing images in which the driver is imaged. Said images can be communicated to the control device 3, and, on the basis of the images, the control device 3 can check whether or not the driver takes control of the steering wheel 7 in the abovementioned transition mode when switching from the automatic driving mode to the manual driving mode. Moreover, the degree of fatigue of the driver can optionally be determined as well.

As already explained, a input device 27 can be arranged on the steering wheel 7. Said input device can have a touchpad 28 having a touch-sensitive surface 29, which in particular also forms the surface of the cover 22. The touchpad 28 is designed to detect a position at which the driver touches the touch-sensitive surface 29 with his/her finger. These items of information are registered by the control unit 12. Optionally, the input device 27 can also comprise operating elements arranged on at least one of the steering wheel spokes 20. Such an operating element is denoted by 30 in FIG. 2. The driver can activate and/or deactivate the automatic driving mode, for example, by means of the operating element 30.

In the manual driving mode, in which the driver guides the motor vehicle 1 himself/herself, the display device 4 can be controlled with the aid of the input device 27 arranged on the steering wheel 7, namely by means of the touch-sensitive surface 29 and/or by means of the operating elements mentioned. In the manual driving mode, exclusively driving-related information, but not multimedia data and the like, can be displayed by means of the display device 4. However, if switching to the automatic driving mode is carried out, then the control unit 12 activates an entertainment mode, in which the display device 4 can be used for multimedia data as well. In said entertainment mode, the user interface of the motor vehicle 1 including the input device 27 and the display device 4 can be used as an interface for operating the communication terminal 14. The display device 4 then serves as an output unit of the communication terminal 14; the input device 27 serves as an input unit of the communication terminal 14. The communication connection 15 is set up here. The touch-sensitive surface 29 then serves for controlling the communication terminal 14 and thus for performing inputs on the communication terminal 14. For this purpose, the control unit 12 communicates input data to the communication terminal 14, by which the communication terminal 14 is controlled. On the other hand, image data comprising the current screen content of the display 16 are communicated from the communication terminal 14 to the control unit 12. In other words, data comprising the representation currently being generated on the display 16 are communicated wirelessly from the communication terminal 14 to the control unit 12. Said representation is then also displayed by means of the display device 4. Specifically, the control unit 12 drives the display device 4 such that the representation generated by the display device 4 (for example the representation 25) is synchronized with the representation on the display 16 of the communication terminal 14 and is thus matched thereto.

The communication terminal 14 thus becomes as it were part of an infotainment system of the motor vehicle 1. On account of the spatial decoupling of the display device 4 from the touch-sensitive surface 29, it is possible to use a sensor 31 that detects the position of the driver's finger also above the touch-sensitive surface 29 and relative to the surface 29, specifically in a direction parallel to the surface 29 and thus in the longitudinal and transverse directions of the surface 29. A cursor 32 can then be inserted into the representation 25, the position of said cursor within the representation 25 being set depending on the measured position of the finger above the touch-sensitive surface 29. The position of the cursor 32 relative to the representation 25 thus corresponds to the position of the finger relative to the surface 29 or to the hub 21. Consequently, the driver can activate for example the desired applications on the communication terminal 14 using the input device 27.

Referring to FIG. 1, the control unit 12 can also receive image data or video data provided by cameras 33, 34 which are arranged laterally on the motor vehicle 1 and can be integrated into the respective exterior mirrors, for example. The video data of the cameras 33, 34 can also be displayed in the context of the representation 25 by means of the display device 4. In this case, for example—as illustrated schematically in FIG. 2—the representation 25 can be subdivided into three regions, namely a central region 35, a left edge region 36 and a right edge region 37. Video data of the left camera 33 can be displayed in the left edge region 36; video data of the right camera 34 can be displayed in the right edge region 37. Consequently, the driver receives a display also of images of the surrounding region by means of the display device 4 and can thus always view the windscreen 11, as a result of which attention is immediately directed at the road situation when the automatic driving mode is deactivated. In this case, the video data are displayed exclusively in the entertainment mode and are deactivated again after switching to the manual driving mode.

As illustrated in FIG. 1, the motor vehicle 1 can comprise a decoupling device 38, which is embodied such that, in the entertainment mode or in the automatic driving mode, the steering wheel 7 is completely decoupled from the steering movement of the steerable wheels of the motor vehicle 1 and thus does not turn during the steering of the wheels. The decoupling device 38 can for example also ensure that the steering wheel 7 is always kept in the zero position. This then facilitates the operation of the input device 27.

The invention claimed is:

1. A method for operating a motor vehicle, which is switched between a manual driving mode, in which the motor vehicle is guided by a driver, and an automatic driving mode, in which longitudinal guidance and transverse guidance of the motor vehicle are carried out automatically by a control device of the motor vehicle, wherein, at least in the manual driving mode, a vehicle-specific display device of the motor vehicle is operated by an input device arranged on a steering wheel of the motor vehicle, the method comprising:

establishing a communication connection between a communication device of the motor vehicle and a portable communication terminal separate from the motor vehicle;

making a determination that the motor vehicle is in the automatic driving mode, and based on the determination, activating an entertainment mode, and when in the entertainment mode:
- transmitting, via the communication connection, input data generated by the input device of the steering wheel to the communication terminal; and
- transmitting image data generated by the communication terminal for display on the display device to the communication device of the motor vehicle,
  - wherein the input device is used for carrying out inputs at the communication terminal, and the display device is used for displaying image data of the communication terminal.

2. The method according to claim 1, wherein the entertainment mode is deactivated when the motor vehicle is switched from the automatic driving mode to the manual driving mode.

3. The method according to claim 1, wherein the image data communicated from the communication terminal to the communication device comprise a current screen content of the communication terminal and a representation displayed by means of the display device is generated in accordance with the screen content of the communication terminal.

4. The method according to claim 1, wherein the input device of the steering wheel comprises a touch-sensitive surface and the input data are generated depending on a position at which the touch-sensitive surface is touched by the driver.

5. The method according to claim 4, further comprising detecting, by a sensor, a position of a body part of the driver above the touch-sensitive surface of the steering wheel, relative to the touch-sensitive surface, and inserting a cursor into a representation displayed by the display device, the position of said cursor being set depending on the position of the body part above the touch-sensitive surface.

6. The method according to claim 1, wherein a display of an instrument cluster of the motor vehicle is used as the display device.

7. The method according to claim 1, wherein a head-up-display and/or a display arranged on the steering wheel is used as the display device.

8. The method according to claim 1, further comprising completely decoupling the steering wheel, via a decoupling device of the motor vehicle, from a steering movement of the steerable wheels of the motor vehicle in the entertainment mode.

9. The method according to claim 1, wherein images which are based on image data provided by at least one camera arranged on the motor vehicle are displayed on the display device in the entertainment mode.

10. A motor vehicle which is switchable between a manual driving mode and an automatic driving mode, comprising:
- a control device configured to automatically carry out longitudinal guidance and transverse guidance of the motor vehicle in the automatic driving mode;
- a display device;
- an input device arranged on a steering wheel of the motor vehicle and serving for operating the display device at least in the manual driving mode;
- a communication device for establishing a communication connection to a portable communication terminal; and
- a control unit configured to make a determination that the motor vehicle is in the automatic driving mode, and based on the determination, activate an entertainment mode, and when in the entertainment mode:
  - transmit, via the communication connection, input data generated by the input device of the steering wheel to the communication terminal; and/or
  - receive image data generated by the communication terminal and display the image data on the display device.

* * * * *